United States Patent
Giusto et al.

(10) Patent No.: US 11,921,468 B2
(45) Date of Patent: Mar. 5, 2024

(54) METHOD AND PRODUCTION SUPPORT TOOLING FOR MEASURING THE TORQUE OF A TIMEPIECE BALANCE SPRING

(71) Applicant: Nivarox-FAR S.A., Le Locle (CH)

(72) Inventors: Nicola Giusto, Le Locle (CH); Joseph Balossi, Villers-le-lac (FR); Francois Fahrni, Le Locle (CH); Davy Cretenet, La Chaux-de-Gilley (FR)

(73) Assignee: Nivarox-FAR S.A., Le Locle (CH)

( * ) Notice: Subject to any disclaimer, the term of this patent is extended or adjusted under 35 U.S.C. 154(b) by 1084 days.

(21) Appl. No.: 16/662,222

(22) Filed: Oct. 24, 2019

(65) Prior Publication Data
US 2020/0159171 A1 May 21, 2020

(30) Foreign Application Priority Data
Nov. 15, 2018 (EP) .................................... 18206381

(51) Int. Cl.
*G01N 3/00* (2006.01)
*G04D 7/10* (2006.01)

(52) U.S. Cl.
CPC .............. *G04D 7/10* (2013.01); *G01N 3/00* (2013.01); *G01N 2203/0288* (2013.01)

(58) Field of Classification Search
CPC ..... G04D 7/10; G01N 3/00; G01N 2203/0288
See application file for complete search history.

(56) References Cited

U.S. PATENT DOCUMENTS

| | | | |
|---|---|---|---|
| 3,994,168 A | 11/1976 | Varga | |
| 2012/0048035 A1* | 3/2012 | Cerutti | G04D 7/08 73/862.321 |

FOREIGN PATENT DOCUMENTS

| | | |
|---|---|---|
| CN | 1070264 A | 3/1993 |
| CN | 2261621 Y | 9/1997 |
| CN | 1781060 A | 5/2006 |
| CN | 201993191 U | 9/2011 |
| CN | 102436171 A | 5/2012 |
| CN | 203673235 U | 6/2014 |

(Continued)

OTHER PUBLICATIONS

Japanese Office Action dated Dec. 8, 2020 in Japanese Patent Application No. 2019-202923 (with English Translation), 5 pages.

(Continued)

*Primary Examiner* — Jamel E Williams
(74) *Attorney, Agent, or Firm* — Oblon, McClelland, Maier & Neustadt, L.L.P.

(57) ABSTRACT

A method for measuring the torque of a balance spring, made, in particular, of micromachinable material. A gripper places the collet on an insertion guide on the vertex of a mock obelisk-shaped arbor for a first centring of the collet, this balance spring is allowed to slide under its own weight along the guide surmounting a frustoconical shank that completes the self-centring of the collet on the tool axis, and for holding this balance spring without stress on the shank, the mock arbor including a drive device cooperating with the inner contour of the collet for the relative driving in rotation thereof without slipping, a holding tool holds the outer coil of the balance spring, to measure the torque of the balance spring by rotating the main tool and/or the holding tool about the axis, without stressing the balance spring.

29 Claims, 4 Drawing Sheets

(56) References Cited

FOREIGN PATENT DOCUMENTS

| CN | 104769512 A | 7/2015 |
|----|----|----|
| CN | 204496165 U | 7/2015 |
| CN | 207964162 U | 10/2018 |
| EP | 2 128 723 A1 | 12/2009 |
| EP | 2 423 764 B1 | 3/2013 |
| JP | 59-142429 A | 8/1984 |
| SU | 716682 A1 | 2/1980 |

OTHER PUBLICATIONS

European Search Report dated Jul. 9, 2019 in European Application 18206381.8 filed on Nov. 15, 2018 (with English Translation of Categories of Cited Documents).
Combined Chinese Office Action and Search Report dated Dec. 15, 2020 in Chinese Patent Application No. 201911119400.3 (with English translation of Categories of Cited Documents), 7 pages.
Korean Office Action dated Sep. 28, 2020 in Korean Application 10-2019-0142475 (with English Translation), 6 pages.

* cited by examiner

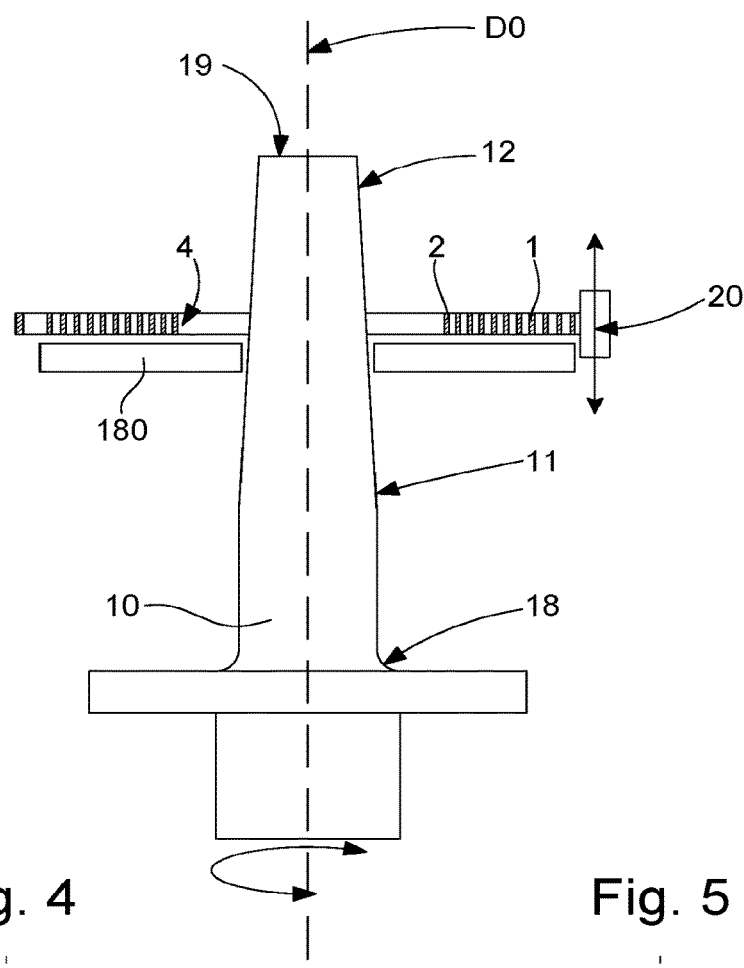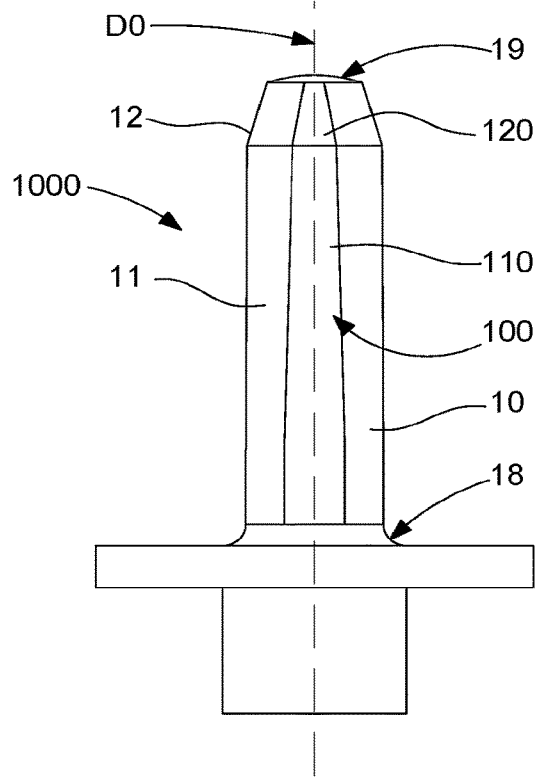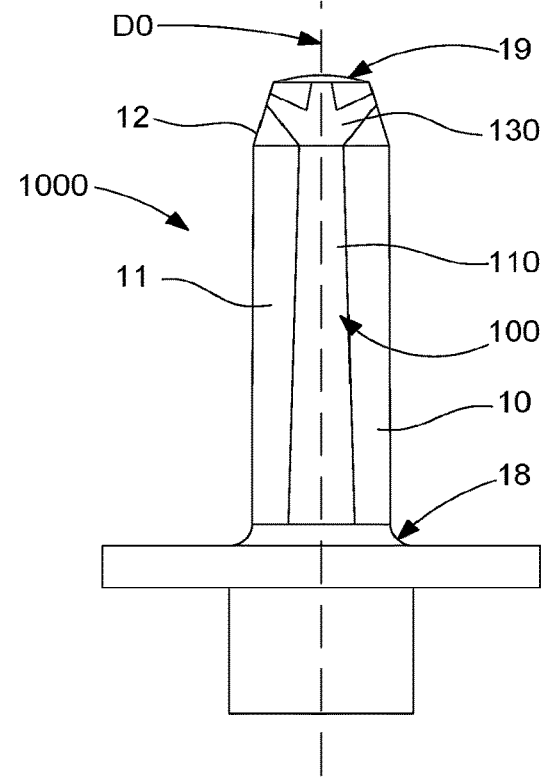

METHOD AND PRODUCTION SUPPORT TOOLING FOR MEASURING THE TORQUE OF A TIMEPIECE BALANCE SPRING

CROSS-REFERENCE TO RELATED APPLICATION

This application claims priority to European Patent Application No. 18206381.8 filed on Nov. 15, 2018, the entire disclosure of which is hereby incorporated herein by reference.

FIELD OF THE INVENTION

The invention concerns a method for measuring the torque of a balance spring for a timepiece oscillator, wound around a balance spring axis and comprising a collet at its inner end, and an outer coil at its outer end, said collet comprising an aperture whose inner surface includes centring surfaces, which are arranged to cooperate with an arbor of revolution about said balance spring axis and to centre said balance spring on such an arbor, and which, in the free state of said balance spring, define a passage diameter.

The invention also concerns a production support tooling for implementing such a method for measuring the torque of a balance spring, made, in particular, of micromachinable material or silicon.

The invention concerns the manufacture and development of timepiece oscillators comprising balance springs, and more particularly springs made of micromachinable material or silicon.

BACKGROUND OF THE INVENTION

The angular and vertical position of a silicon or similar balance spring is currently maintained, during the measurement of the balance spring torque, by a cylindrical arbor. The diameter of this cylindrical arbor is defined as a function of the internal diameter inscribed in the collet. The angular and vertical position of the balance spring collet is maintained, during the measurement of the balance spring torque, by clamping the collet on the cylindrical arbor. This clamping is obtained by elastic deformation of the collet. The value of the clamping force is defined as a function of the diameter of the arbor.

This standard method of working has, however, drawbacks:
- risk of chipping, i.e. microfractures on an edge. As silicon is known to be a very brittle material under mechanical stress, inserting the collet of a silicon balance spring in an automated press fit process onto a mock arbor having a conventional cylindrical profile, defined to ensure the balance spring is held in position during the measurement of its torque, can produce stresses in the balance spring material. These harmful stresses can lead to a risk of chipping the balance spring and product defects This chipping may prove very critical since it can cause incipient cracks in the collet and a risk of breakage of the latter, which will be detected subsequently when it is set in motion;
- wear and contamination of the cylindrical arbor of the tool. The principle of the cylinder-shaped mock arbor produces friction between the collet and mock arbor, during the insertion and removal of the balance spring collet from the mock arbor. In an automated process, this repeated friction on multiple balance springs causes wear which may be a source of contamination of the mock arbor and therefore of the balance spring. This contamination is critical as regards the quality of the end product. This repeated friction will also change the profile of the mock arbor with an immediate effect on the retention of the angular and vertical position of the balance spring during the torque measurement, resulting in a loss of accuracy in the measurement of the balance spring torque;
- difficulty in ensuring the precision of alignment between the collet and the torque measuring system. The principle of the cylindrical mock arbor requires high precision alignment between the gripper that holds the balance spring during insertion and the mock arbor. Misalignment has the consequence of creating and producing an impact or shock on the collet as it is inserted onto the mock arbor, with a significant risk of chipping;
- difficulty in holding the collet correctly, with good angular and vertical referencing. On a cylindrical mock arbor, angular and vertical retention and referencing of the balance spring is achieved by a specific design of the mock arbor, in order to ensure a light clamping force of the collet on the mock arbor. This clamping force, which generates stress in the collet, depends on variations in the manufacturing tolerances of the mock arbor and of the balance spring collet. Further, multiple insertions of the collet onto the cylindrical mock arbor risk causing wear of the latter through chipping, producing a forced angular orientation and play between the collet and the mock arbor, and impairing measurement accuracy.

European Patent document No. EP2423764B1 proposes a solution to overcome these various drawbacks, through the use of a split arbor instead of the usual cylindrical arbor: this split arbor is clamped to allow insertion of the collet, and released in a suitable position of the collet in order to measure the torque of the balance spring, which is held by the elastic return force of the split arbor. However, the collet is thus subjected to further stress during the torque measurement cycle, which distorts this measurement and/or which may cause chipping. This principle also requires precise alignment of the clamp to prevent deformation on the measurement axis, and thus interference in the measurement.

SUMMARY OF THE INVENTION

The invention proposes to develop a novel method of maintaining the angular and vertical position in the field of gravity of the collet of a timepiece balance spring, and more particularly of a balance spring made of micromachinable material or silicon, during the measurement of the torque of this balance spring on a production support tooling designed for an automated measuring process, with minimal deformation of the balance spring, other than that due to oscillation.

The solution proposed by the invention uses a static principle of holding the balance spring at its inner end.

Thus, the invention concerns a method for measuring the torque of a balance spring for a timepiece oscillator according to claim 1.

The invention also concerns a production support tooling for implementing a method for measuring the torque of a balance spring according to claim 21.

BRIEF DESCRIPTION OF THE DRAWINGS

Other features and advantages of the invention will appear upon reading the following detailed description, with reference to the annexed drawings, in which:

FIG. 3 represents a schematic sectional view through the axis of the mock arbor of FIG. 1, of the mock arbor and the holding tool carrying the balance spring, and additional upper and lower tools, each arranged to exert an axial thrust force on the balance spring.

FIG. 4 represents a schematic elevation view of a mock arbor in the form of an obelisk and comprising oblique flat portions for guiding and/or driving functions, both on a lower shank for holding the balance spring, and on an upper shank for insertion of the balance spring.

FIG. 5 represents a schematic elevation view of a mock arbor in the form of an obelisk and comprising oblique flat portions on a lower shank for holding the balance spring, and spiral grooves on an upper shank for insertion of the balance spring.

DETAILED DESCRIPTION OF PREFERRED EMBODIMENTS

Figure 1:
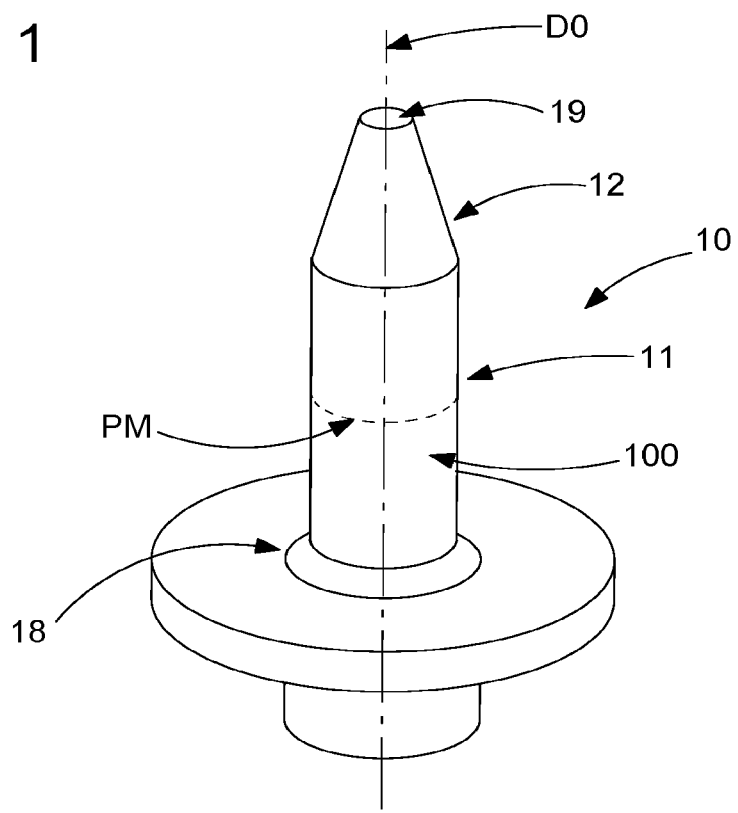
FIG. 1 represents a schematic perspective view of a mock arbor, in the form of an obelisk, and according to the invention, comprised in a main tool of a production support tooling arranged for measuring the torque of a balance spring for a timepiece oscillator.
Figure 2:
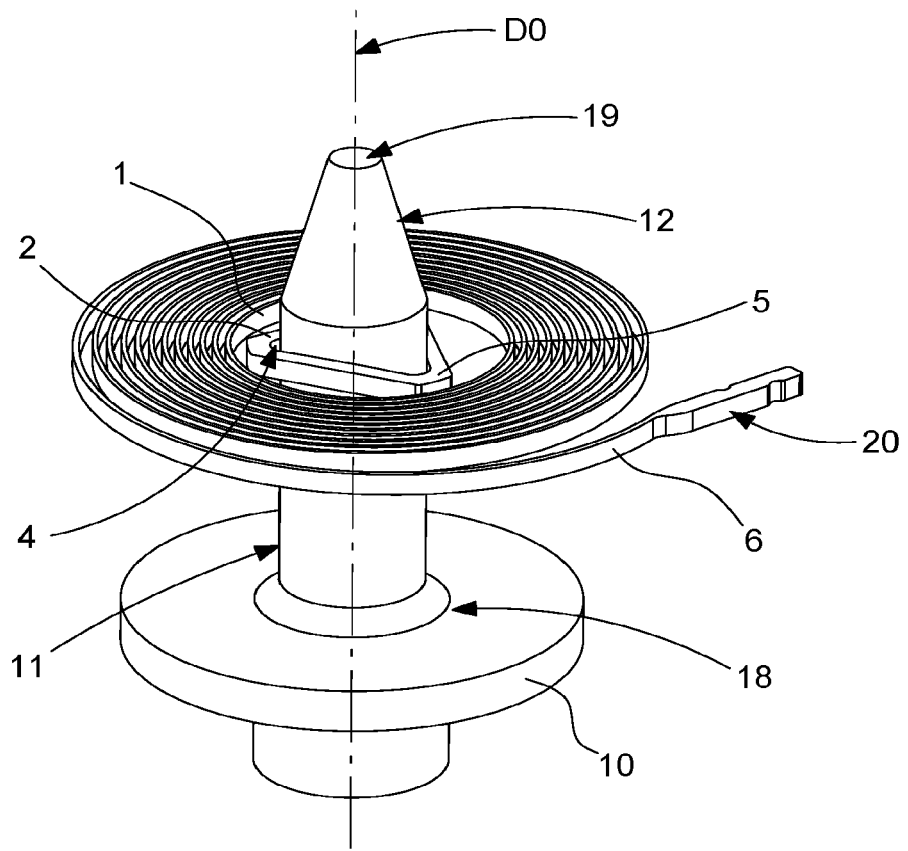
FIG. 2 represents, in a similar manner to FIG. 1, the same mock arbor, on which bears the collet of a balance spring, whose outer coil is held by a holding tool arranged to grip this outer coil.
Figure 6:
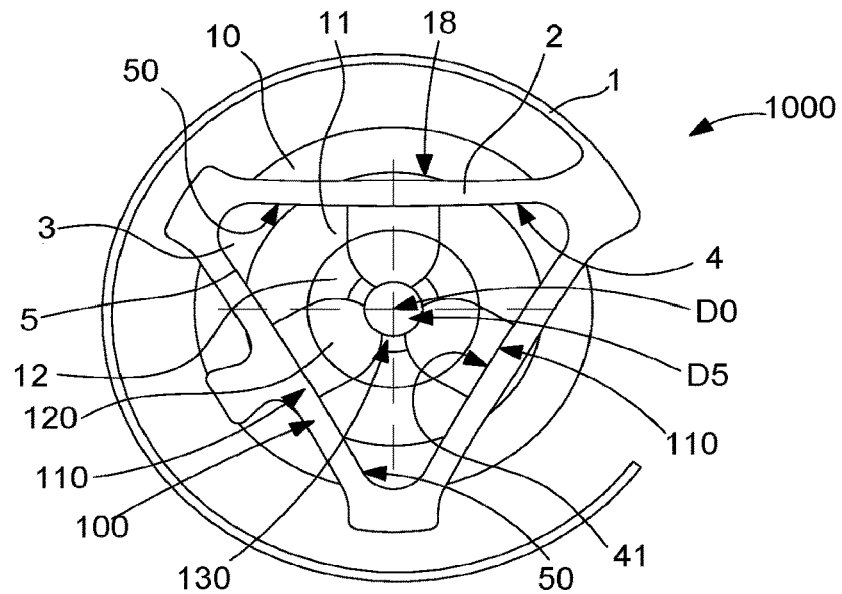
FIG. 6 shows a schematic partial top view of the mock arbor of FIG. 5 carrying a balance spring.
Figure 7:
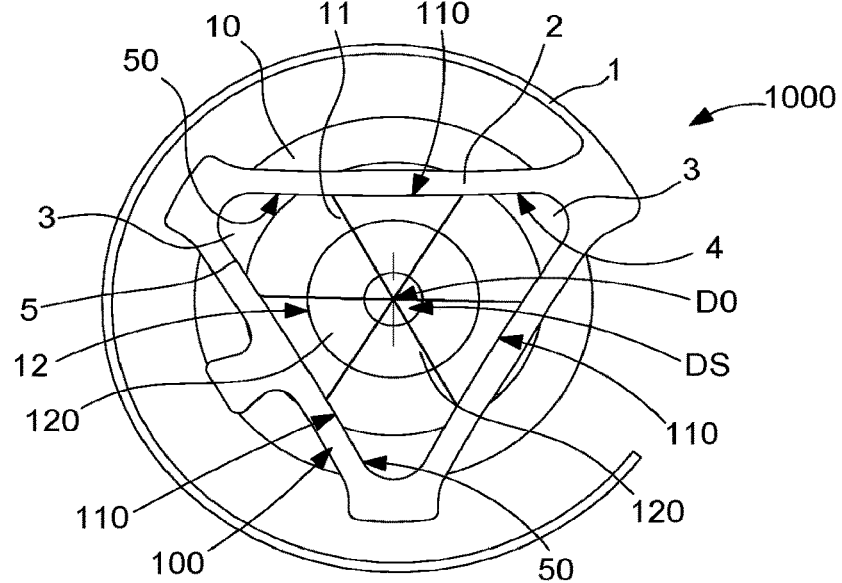
FIG. 7 shows a schematic partial top view of the mock arbor of FIG. 4 carrying a balance spring.
Figure 8:
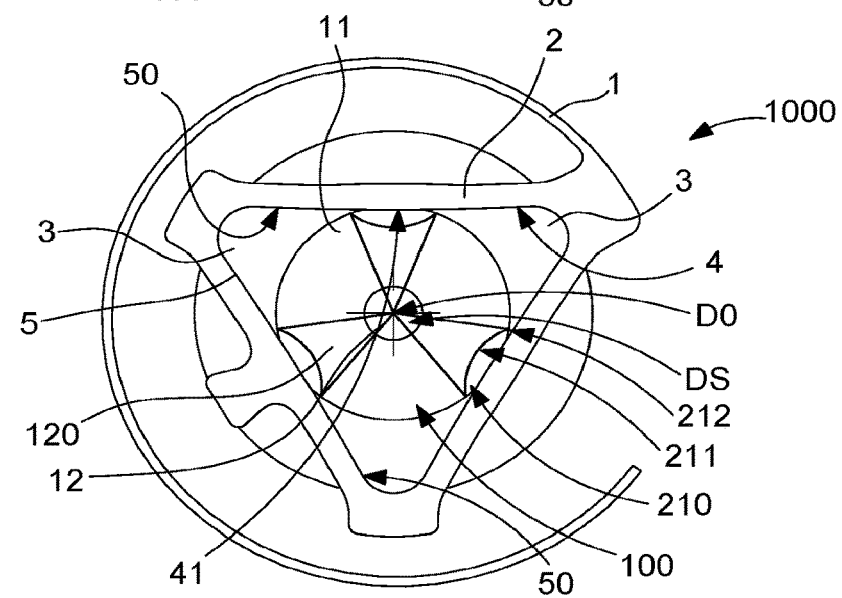
FIG. 8 represents a schematic partial top view of a mock arbor similar to that of FIG. 5 but having rectilinear grooves instead of flat portions and carrying a balance spring.
Figure 9:
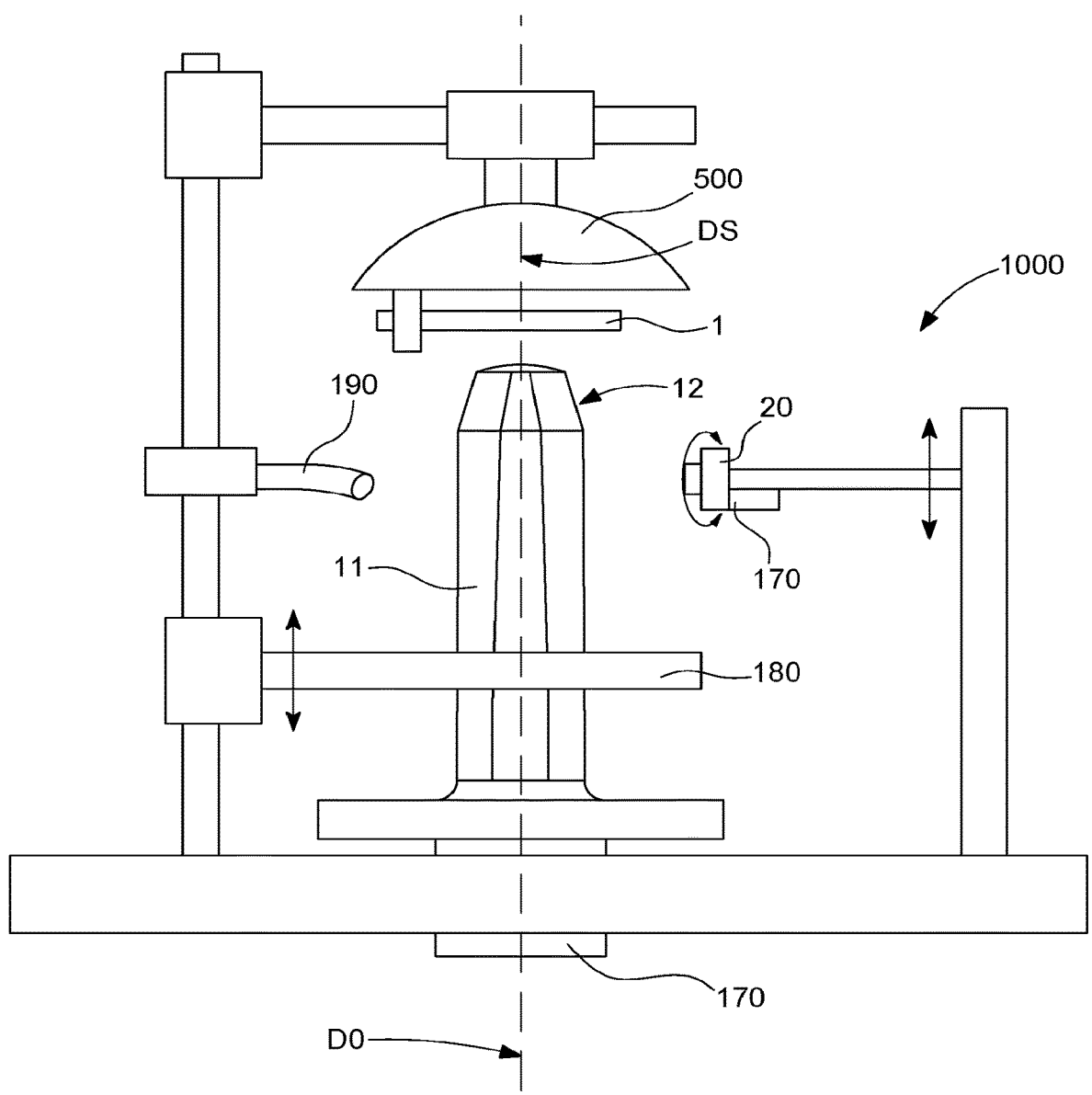
FIG. 9 represents a schematic elevation view of a production support tooling comprising the mock arbor of FIG. 4, the holding tool of FIG. 2, the additional tools of FIG. 3 and a gripper arranged to manipulate a balance spring.

The invention concerns the method for maintaining the angular and vertical position in the field of gravity of the collet of a timepiece balance spring 1, in particular but not exclusively made of micromachinable material, silicon, silicon and silicon dioxide, DLC, metallic glass, other at least partially amorphous material, or suchlike, during the measurement of the torque of the balance spring on a production support tooling designed for an automated measuring process, with minimal deformation of the balance spring, other than due to oscillation.

The solution proposed by the invention uses a static principle of holding the balance spring at its inner end. It is a question of eliminating any stress imparted to the balance spring collet by a holding tool, and thereby avoiding creating undesired stresses in the active coils of the balance spring, and avoiding changing the real active length of the balance spring.

The invention relies on the use of a specific production support tooling 1000, which includes a main tool which, instead of a conventional cylindrical arbor, or a split arbor or a resilient arbor, has a mock arbor 10, specially designed for the gentle placing of a collet 2 of such a balance spring 1 by a gripper 500, or by an operator, in order to correctly centre this collet on the axis DO of mock arbor 10, and to drive in rotation, with minimal stress, mock arbor 10 relative to a holding tool arranged to grip and hold the outer coil 6 of this balance spring 1.

The profile of mock arbor 10 is preferably of the obelisk type and comprises at least two areas which each have a clearly defined role in ensuring proper conduct of the torque measuring process, with minimal undesired stress.

Mock arbor 10 includes a first area, or 'upper' area. More particularly, but not exclusively, this first area has a conical portion around an axis DO; in other variants it may have at least one portion of revolution around this axis DO, with a parabolic, elliptical or other profile, or combine several surfaces of revolution around the same axis DO.

This first area forms the interface between, on the one hand, a gripper 500, also called a pick and place device, which may be a robot or suchlike, which is arranged to carry balance spring 1, and on the other hand, a second area which is an area for holding balance spring 1 during the torque measurement.

It is clear that the invention, intended for maximum automation, is also designed for laboratory use where a human operator handles spring 1. This variant of use is not described in detail here, gripper 500 in such case conventionally comprises a pair of tweezers. The following description uses gripper 500 in the broad sense of the term.

The first area has two main functions:
exchanging and transferring balance spring 1 from gripper 500 onto mock arbor 10 without exerting stress on collet 2 of balance spring 1;
recentring balance spring 1 on mock arbor 10; the profile allows some latitude in positioning, for example a maximum possible angular error of +/−20° of the balance spring on gripper 500 relative to mock arbor 10.

This first area is extended, in the lower part of production support tooling 1000, by a second area, or 'lower' area, which has a specific shape, with a profile that is defined to ensure three main functions:
the precise and repeatable positioning of balance spring 1 on the balance spring torque measuring station;
maintaining the angular and vertical position in the field of gravity of collet 2 of balance spring 1 during the measurement of the balance spring torque on mock arbor 10;
the accuracy of the torque measurement of balance spring 1.

Thus, more particularly, the invention concerns a method for measuring the torque of a balance spring 1 for a timepiece oscillator, made, in particular, of micromachinable material or silicon or similar material, this balance spring 1 comprising a collet 2 at its inner end, and an outer coil 6 at its outer end. In a conventional manner, collet 2 has an aperture 3 which, in the free state of balance spring 1, has an inner surface 4. More particularly, this inner surface 4 includes at least one flat portion, or is substantially polygonal around the balance spring axis DS of balance spring 1 about which balance spring 1 is wound in a polygonal contour 5 with N sides in projection onto balance spring axis DS. More generally, inner surface 4 of aperture 3 includes centring surfaces 41, which are arranged to cooperate with an arbor of revolution about balance spring axis DS and to centre balance spring 1 on such an arbor; these centring surfaces define a passage diameter DP in the free state of balance spring 1. More particularly, they are tangent to a geometrical cylinder of revolution about balance spring axis DS defining this passage diameter DP.

According to the invention:
the dimensions of inner surface 4 or of passage diameter DP are determined;

as a function of these dimensions, there is a chosen a main tool comprising a mock arbor 10 in the form of an obelisk of decreasing cross-section from its base 18 in the lower part, towards its vertex 19 in the upper part, on a tool axis DO.

This mock arbor 10 includes, in the upper part, a first upper area with an insertion guide 12, each section of which, in projection onto a plane perpendicular to tool axis DO is inscribed in aperture 3 of collet 2, in particular inscribed in inner surface 4 or polygonal contour 5. Insertion guide 12 is arranged for a first centring of a collet 2 of a balance spring 1, which is placed on the upper part, on vertex 19, and which is allowed to slide freely under its own weight along insertion guide 12. Mock arbor 10 is of continuously increasing cross-section, along rectilinear tool axis DO, from its apex 19 in the upper part where the envelope diameter of mock arbor 10 is smaller than passage diameter DP, towards its base 18.

Insertion guide 12 surmounts a second lower area, which includes at least a lower shank 11 of substantially frustoconical shape arranged to complete the self-centring of a collet 2 on tool axis DO, and to hold a balance spring 1 without stress on lower shank 11. Substantially frustoconical shape means that lower shank 11 preferably has surfaces of revolution about tool axis DO, which are not necessarily entirely of revolution, i.e. they are regularly angularly arranged conical or similar sectors, or even regularly arranged edges; as explained above the conical shape represented in the Figures is a specific shape. but the profile may be parabolic, elliptical or otherwise, or even combine several different types of curves, the important point being good tangency of these curves relative to one another to allow collet 2 to slide freely over lower shank 11, and self-centring of the collet on tool axis DO.

In a particular embodiment, insertion guide 12 is substantially inscribed in a cone, with an upper cone angle comprised between 5° and 45°, more particularly between 10° and 20°, more particularly still between 14° and 16°.

In a particular embodiment, lower shank 11 is substantially inscribed in a cone, with a lower cone angle which is greater than 0° and less than 10°, more particularly comprised between 0.5° and 3°, more particularly still between 0.5° and 1.5°.

Lower shank 11 comprises drive means 100, which are arranged to cooperate with an inner surface 4 of a collet 2 in order to drive in rotation mock arbor 10, without slipping, via a collet 2 or vice versa; in the illustrated embodiment, these drive means 100 are either a flat portion arranged to cooperate with that of inner surface 4 of collet 2, or first flat portions 110 arranged to cooperate with those of polygonal contour 5 of inner surface 4 of collet 2, or a recess arranged to cooperate with the flat portion of inner surface 4 of collet 2, or first recesses 210, for example longitudinal slots or grooves, which are arranged to cooperate with the contour of the inner surface, or with the flat portions of polygonal contour 5 as appropriate, for the relative driving thereof when a torque is applied to balance spring 1. These first flat portions 110, or first recesses 210, or still other surfaces, are preferably all symmetrical with respect to a plane passing through tool axis DO, and the angular orientation of the intersection of each of these surfaces forming drive means 100, in such a plane through tool axis DO, and with respect to tool axis DO, is the same.

Tool axis DO is then aligned on the vertical of the place in the field of gravity.

Next, balance spring 1 is gripped with a gripper 500, by means of which the balance spring 1 to be measured is placed simply by gravity on insertion guide 12, and balance spring 1 drops down onto lower shank 11 until stopped simply by the effect of its weight, in a self-centring axial position referred to as the 'measuring position'.

The coaxiality of balance spring axis DS of balance spring 1 and tool axis DO is then checked in the measuring position. More particularly, when balance spring axis DS of balance spring 1 is not aligned with tool axis DO in the measuring position, a thrust force is applied to balance spring 1 with a flat lower tool 180 from base 18 to vertex 19 or vice versa, along tool axis DO, to reposition balance spring 1 in its measuring position, and the positioning of balance spring, simply by its weight, is repeated until balance spring axis DS is aligned with tool axis DO.

When balance spring axis DS of balance spring 1 is aligned with tool axis DO in the measuring position, a holding tool 20, which is arranged to grip outer coil 6 of balance spring 1, is placed level with the measuring position in the direction of tool axis DO, and outer coil 6 is fixed to holding tool 20.

Then, using measuring means 170, the torque of balance spring 1 is measured by rotating the main tool and/or holding tool 20 about tool axis DO, without stressing balance spring 1.

The measuring position may comprise a deviation in the vertical direction of the field of gravity between collet 2 and outer coil 6: balance spring 1 may be intentionally placed in an 'umbrella' position, where it has a substantially conical envelope, and holding tool 20 is vertically adjustable for this purpose, allowing outer coil 6 to be placed above or below collet 2, depending on the chosen operating range. Depending on the measurement range to be applied, an adjustment is made to the vertical position of holding tool 20, either to hold balance spring 1 in a plane, or to give it a rising or falling umbrella shape, according to a predetermined offset value which is less than four times the height of the coils of balance spring 1. More particularly, this adjustment is made to the vertical position of holding tool 20 to give said balance spring an umbrella shape, according to a predetermined offset value less than or equal to the height of the coils of balance spring 1.

Depending on the measurement range to be applied, if necessary, holding tool 20 is oriented to give a slight twist of predetermined value to outer coil 6 of the balance spring.

More particularly, after the measurement, balance spring 1 is driven above vertex 19 in order to be removed, by a translation of holding tool 20 parallel to tool axis DO, and/or by a translation of the main tool with respect to holding tool 20, and/or by thrusting balance spring 1 with a lower flat tool 180, from base 18 to vertex 19 parallel to tool axis DO, balance spring 1 is then removed by gripper 500 or any other suitable means and identified in relation to the torque measurement performed.

More particularly, when inner surface 4 of the collet has a polygonal profile, drive means 100 comprise at least one section of lower shank 11, which is arranged to be tangent to polygonal contour 5 at at least N points in the measuring position.

More particularly, drive means 100 include at least one friction surface, which is arranged to cooperate with inner surface 4 of collet 2 for the relative driving thereof by friction when a torque is applied to balance spring 1.

More particularly, insertion guide 12 is an upper shank of substantially frustoconical shape such that, in projection onto a plane perpendicular to tool axis DO, any section of upper shank 12 is inscribed in aperture 3 of collet 2, particularly within inner surface 4, or polygonal contour 5 as appropriate.

In another variant, once balance spring 1 is placed in the measuring position, it is also possible to implement, resting on balance spring 1 near vertex 19, either a third tool arranged to exert an axial force on collet 2 for the axial retention thereof during the torque measuring operation, or a free weight simply placed on balance spring 1. However, it is clear that the main advantage of the invention is that it is possible to perform the balance spring torque measurement with the least possible stress on the balance spring, hence this variant is reserved for very specific cases, such as, for example, a multiple spiral spring, comprising several distinct coils extending over several parallel planes, or a spring comprising a helical portion, or yet another configuration wherein a lower coil of the spring correctly held on mock arbor 10 is not necessarily parallel to another coil situated in another theoretical plane and whose outer coil 6 cooperates with holding tool 20.

More particularly, the main tool is chosen to have a number N of first flat portions 110 or of first recesses 210 provided on its lower shank 11, each symmetrical with respect to a plane passing through tool axis DO, and more particularly at the cone angle of lower shank 11, when the latter is conical, and in the extension of first flat portions 110, a number N of second flat portions 120 or of second recesses 220 provided on its upper shank each one symmetrical with respect to a plane passing through tool axis DO, and more particularly at the cone angle of the upper shank when the latter is conical.

And, when balance spring 1 is placed on upper shank 12 and/or when balance spring 1 is resting on lower shank 11, inner flat portions 50 of inner surface 4 or of polygonal contour 5, as appropriate, are then angularly aligned with first flat portions 110 or first recesses 210 on the one hand, and second flat portions 120 or second recesses 220 on the other hand, by rotating balance spring 1 and/or the main tool.

More particularly, the main tool is chosen to have, between its vertex 19 and second flat portions 120 provided on its upper shank 12, or between its vertex 19 and first flat portions 110 provided on its lower shank 11, an entry guide profile 130 or a helical profile in order to guide inner flat portions 50 to rest on second flat portions 120 or towards first flat portions 110.

More particularly, gripper 500, arranged to effect the placing of balance spring 1 via gravity on insertion guide 12, is chosen to be a vacuum gripper, which has the advantage of being able to be used to pick balance spring 1 up again once the torque measuring operation has been performed.

More particularly, gripper 500 may thus form a third tool, as explained above and for very specific cases, for the axial holding of collet 2 during the torque measuring operation.

More particularly, holding tool 20 is fixedly held during measurement of the torque of balance spring 1, and mock arbor 10 is fixed to an escapement-holder which includes pneumatic means 190 for rotating balance spring 1 by blowing air.

More particularly, holding tool 20 is oriented to give at least a slight twist to outer coil 6 of balance spring 1 to create an umbrella effect in balance spring 1.

More particularly, when balance spring 1 is gripped by gripper 500, optical and/or mechanical means are used to orient a flat portion of inner surface 4, or the flat portions of polygonal contour 5, as appropriate, to face other flat portions 110 or to face recesses 210 comprised in mock arbor 10.

More particularly, the method is applied to a balance spring 1 having a triangular polygonal contour 5, and contact is made between mock arbor 10 and inner surface 4 of collet 2 in at least six concentric points.

More particularly, the method is applied to a balance spring 1 having a triangular polygonal contour 5 and contact between mock arbor 10 and inner surface 4 of collet 2 is limited to six concentric points.

The invention also concerns a production support tooling 1000 for implementing a method for measuring the torque of such a balance spring 1, particularly a balance spring made of micromachinable material or silicon, and particularly but not exclusively for implementing the invention explained above.

This production support tooling 1000 includes at least a main tool comprising an obelisk-shaped mock arbor 10 of decreasing cross-section from its base 18 in the lower part, towards its vertex 19 in the upper part, along a tool axis DO.

Mock arbor 10 is of continuously increasing cross-section, along this rectilinear tool axis DO, from its vertex 19 in the upper part where the envelope diameter of mock arbor 10 is smaller than passage diameter DP of inner surface 4 of the collet of a balance spring 1, towards its base 18 in the lower part where the envelope diameter of mock arbor 10 is greater than passage diameter DP of balance spring 1.

Mock arbor 10 includes, in the upper part, at least one insertion guide 12, every section of which, in projection onto a plane perpendicular to tool axis DO, is inscribed in aperture 3 of collet 2, particularly within the contour of an inner surface 4 of a collet 2 of a balance spring 1, or of a polygonal contour 5, as appropriate.

This insertion guide 12 is arranged for a first centring of a collet 2 of a balance spring 1 placed on the upper part and allowed to slide freely under its own weight along insertion guide 12, and insertion guide 12 surmounts at least a lower shank 11, of substantially frustoconical shape as explained above, arranged to finish the self-centring of a collet 2 on tool axis DO, and to hold a balance spring 1 without stress on lower shank 11.

This lower shank 11 includes drive means 100, which are arranged to cooperate with an inner surface 4 of a collet 2 to drive in rotation mock arbor 10, without slipping, via a collet 2 or vice versa.

Production support tooling 1000 further includes a holding tool 20, which is arranged to grip an outer coil 6 of a balance spring 1, and measuring means 170, which are arranged to make a measurement of the torque of a balance spring 1.

More particularly, mock arbor 10 is rigid.

In a particular embodiment, mock arbor 10 includes at least a lower shank 11, lips that are at least radially elastic with respect to tool axis DO, which are arranged to come into contact with inner surface 4 of a collet 2.

Advantageously, production support tooling 1000 includes means for translation of holding tool 20 parallel to tool axis DO, and/or means for translation of the main tool with respect to holding tool 20, and/or means for thrusting balance spring 1 comprising a flat lower tool 180 movable parallel to tool axis DO. In a variant, production support tooling 1000 includes such a lower flat tool 180, which is arranged to be movable, in the vertical direction of the field of gravity from base 18 to vertex 19 or vice versa, in the direction of tool axis DO, in order to position a balance spring 1 in its measuring position.

More particularly, drive means 100 of lower shank 11 include first flat portions 110 or first recesses 210, which are arranged to cooperate in a complementary manner with an inner surface 4 or an inner polygonal contour 5 of a collet 2 for the relative driving thereof when a torque is applied to balance spring 1.

More particularly, production support tooling 1000 further includes a third tool, which is arranged to exert an axial force on collet 2 for the axial holding thereof during the torque measuring operation, and/or includes a free weight arranged to simply be placed on a balance spring 1 after it has been properly positioned in the measuring position.

Production support tooling 1000 advantageously includes at least one gripper 500, which is arranged to grip a balance spring 1, and to place it on insertion guide 12 and/or on the first lower shank. In a particular variant, this gripper 500 is a vacuum gripper, arranged to place a balance spring 1 on said mock arbor 10 and/or to remove a balance spring 1 after measurement.

More particularly, production support tooling 1000 includes vision means able to control the angular orientation of gripper 500 to present balance spring 1 on the main tool in a unique indexed angular position with respect to holding tool 20.

In a variant, the vertical position of holding tool 20 is adjustable in the field of gravity and/or by twisting.

The invention thus provides a satisfactory response to the risk of chipping, by holding the balance spring and avoiding any intense local force, and due to the absence of stress on the collet, other than the actual weight of the balance spring, while it is held during the torque measuring operation.

Since the conventional cylindrical mock arbor is eliminated, the problem of wear and contamination of the tool arbor disappears.

The mock obelisk-shaped arbor of the invention avoids any forced insertion of the collet onto the mock arbor. The balance spring is released freely, without any stress, on top of the mock arbor. The balance spring is positioned angularly and vertically in the field of gravity by its own weight on the profile of the mock obelisk-shaped arbor, which ensures the alignment precision between the collet and the torque measuring system.

Finally, the specific obelisk-shaped profile, adapted to the design of the collet profile, allows angular and vertical holding and referencing of the balance spring, especially on six contact points, which results in a reproducible and repeatable measurement of the balance spring torque, with greater flexibility in the automated process for inserting the balance spring on the mock arbor.

Although the invention is more specifically devised to overcome problems specific to the measurement of the torque of silicon or similar balance springs, its advantages are such that it is perfectly applicable to the case of a conventional balance spring, made of steel or other alloys specific to timepiece balance springs.

In short, the invention provides numerous advantages over prior art methods and tools:

No mechanical stress during the process of measuring the balance spring torque. No collet clamping effect. Balance spring held in position by its own weight.

No mechanical stress during the process of inserting the balance spring on the mock arbor, and the balance spring is inserted and positioned by its own weight.

Specific profile shape of the mock arbor, of the obelisk type, to ensure repeatability and reproducibility of the measurement. Guaranteed angular and vertical referencing of the balance spring on the mock arbor.

Improved efficiency. No chipping as regards the balance spring torque measurement.

No dust or particles on the mock arbor and collet, due to the absence of friction during the measurement process.

Obelisk design of the mock arbor overcomes manufacturing tolerances of the collet, especially as regards its inner dimensions.

Ease of producing automated equipment for the automated control and measurement of the torque of a balance spring made of micromachinable material.

The invention claimed is:

1. A method for measuring a torque of a balance spring for a timepiece oscillator, wound around a balance spring axis and comprising at its outer end an outer coil, and at its inner end a collet with an aperture whose inner surface comprises centering surfaces, which are arranged to cooperate with an arbor of revolution about said balance spring axis and to center said balance spring on such an arbor, and which, in a free state of said balance spring, define a passage diameter, wherein:

dimensions of said inner surface or of said passage diameter are determined;

as a function of said dimensions or of said passage diameter, a main tool is chosen having a mock arbor of continuously increasing cross-section, on a rectilinear tool axis, from an apex in an upper part where an envelope diameter of said mock arbor is smaller than said passage diameter, to its base in a lower part where the envelope diameter of said mock arbor is greater than said passage diameter, said mock arbor comprising in the upper part an insertion guide, every section of which, in projection onto a plane perpendicular to said tool axis, is inscribed in said aperture of said collet, and wherein the envelope diameter of said mock arbor is always smaller than said passage diameter, said insertion guide being arranged for a first centring of said collet of said balance spring placed on said upper part and allowed to slide freely under its own weight along said insertion guide, and said insertion guide surmounting at least a lower shank of substantially frustoconical or obelisk shape and which is arranged to complete the self-centring of said collet on said tool axis, and to hold said balance spring without stress on said lower shank, and said lower shank including drive means which are arranged to cooperate with said inner surface of said collet to drive in rotation said mock arbor, without slipping, via said collet or vice versa;

said tool axis is aligned on a vertical of the place in the field of gravity;

a balance spring to be measured is gripped with a gripper, with which said balance spring to be measured is placed simply by gravity on said insertion guide and allowed to drop down onto said lower shank until stopped simply by the effect of its weight, in a self-centring axial position referred to as a measuring position;

a coaxiality of said balance spring axis of said balance spring with said tool axis is then checked in said measuring position;

when said balance spring axis of said balance spring is aligned with said tool axis in said measuring position, a holding tool, which is arranged to grip the outer coil of said balance spring, is placed level with the measuring position in a direction of said tool axis, and said outer coil is fixed to said holding tool;

an adjustment is made to a vertical position of said holding tool in the vertical direction of the place in the field of gravity, and, using measuring means, a measurement is made of the torque of said balance spring by rotating, about said tool axis, said main tool and/or said holding tool, without stressing said balance spring.

2. The method according to claim 1, wherein, after said measurement, said balance spring is driven above a vertex in order to be removed, by a translation of said holding tool parallel to said tool axis, and/or by a translation of said main tool with respect to said holding tool, and/or by thrusting said balance spring with a lower flat tool from said base to said vertex parallel to said tool axis, and/or by vacuum pressure using a vacuum gripper, and said balance spring is then removed and identified in relation to said torque measurement performed.

3. The method according to claim 1, wherein, when said balance spring axis of said balance spring is not aligned with said tool axis, in said measuring position, a thrust force is exerted on said balance spring with a lower flat tool from said base to a vertex, and the positioning of said balance spring by its own weight is repeated until said balance spring axis is aligned with said tool axis.

4. The method according to claim 1, wherein said gripper arranged to place said balance spring by gravity on said insertion guide, is a vacuum gripper.

5. The method according to claim 4, wherein said vacuum gripper is configured to carry out said removal of said balance spring after said measurement.

6. The method according to claim 1, wherein, prior to the placing of said balance spring on said main tool, an angular position thereof is determined with vision means via which the angular orientation of said gripper is controlled, to present said balance spring on said main tool in a unique angular position wherein the outer coil thereof is positioned in a unique angular position with respect to said main tool and to said holding tool.

7. The method according to claim 1, wherein, depending on a measurement range to be applied, said adjustment is made to the vertical position of said holding tool, either to hold said balance spring in a plane, or to give it a rising or falling umbrella shape, according to a predetermined offset value which is less than four times a height of the coils of said balance spring.

8. The method according to claim 7, wherein said adjustment is made to the vertical position of said holding tool to give said balance spring an umbrella shape, according to a predetermined offset value less than or equal to the height of the coils of said balance spring.

9. The method according to claim 1, wherein, depending on a measurement range to be applied, said holding tool is oriented to give a slight twist of predetermined value to said outer coil of said balance spring.

10. The method according to claim 1, wherein said main tool is chosen with said drive means comprising first flat portions or first recesses, arranged to cooperate in a complementary manner with said inner surface of said collet for a relative driving thereof when a torque is applied to said balance spring or to said mock arbor.

11. The method according to claim 10, wherein said main tool is chosen to have a plurality of first flat portions or first recesses arranged on the lower shank thereof, each one symmetrical with respect to the plane passing through said tool axis and following, in the plane passing through said tool axis, a profile of said lower shank, and, in an extension of said first flat portions, the same number of second flat portions or of second recesses arranged on an upper shank thereof, each one symmetrical with respect to a plane passing through said tool axis and following, in a plane passing through said tool axis, the profile of said upper shank, and wherein, when said balance spring is placed on said upper shank and/or when said balance spring is resting on said lower shank, drive surfaces comprised in said inner surface of said collet is aligned with said first flat portions or first recesses on the one hand, and said second flat portions or second recesses on the other hand, by rotating said balance spring and/or said mock arbor.

12. The method according to claim 11, wherein said main tool is chosen to have, between its said vertex and said second flat portions provided on the upper shank thereof, or between its said vertex and said first flat portions provided on the lower shank thereof, an entry guide profile or a helical profile in order to guide drive surfaces comprised in said inner surface of said collet, to rest on said second flat portions or towards said first flat portions.

13. The method according to claim 10, wherein, when said balance spring is gripped and inserted onto said mock arbor, said first flat portions or first recesses comprised in said mock arbor are pre-oriented, according to the shape of said inner surface of said balance spring, in its angular position for external retention by said holding tool.

14. The method according to claim 1, wherein said main tool is chosen with said drive means comprising a friction surface arranged to cooperate with said inner surface of said collet for a relative friction driving thereof when a torque is applied to said balance spring or to said mock arbor.

15. The method according to claim 1, wherein said holding tool is fixedly held during the measurement of the torque of said balance spring, and said mock arbor is fixed to an escapement-holder which includes pneumatic means for rotating said balance spring by blowing air.

16. The method according to claim 1, wherein said main tool is chosen with said insertion guide which is an upper shank in a substantially frustoconical or obelisk shape.

17. The method according to claim 1, wherein the method is applied to the measurement of the torque of said balance spring wherein said inner surface of said collet has at least one flat portion or a polygonal contour with N regular sides around the balance spring axis of said balance spring, and wherein said main tool is chosen with said drive means comprising at least one section of said lower shank, which is arranged to be tangent to said polygonal contour at at least N points in said measuring position.

18. The method according to claim 17, wherein the method is applied to said balance spring whose polygonal contour is triangular, and wherein contact between said mock arbor and said inner surface of said collet is made in at least six concentric points.

19. The method according to claim 17, wherein said method is applied to said balance spring whose said polygonal contour is triangular, and wherein contact between said mock arbor and said inner surface of said collet is limited to six concentric points.

20. The method according to claim 1, wherein the method is applied to the measurement of the torque of said balance spring made of micromachinable material, silicon, silicon and silicon dioxide, DLC, metallic glass, or an at least partially amorphous material.

21. A production support tooling for implementation of a method for measuring a torque of a balance spring for a timepiece oscillator, said production support tooling including at least one main tool comprising a mock arbor of continuously increasing cross-section, on a rectilinear tool axis, from an apex in an upper part where an envelope diameter of said mock arbor is smaller than a passage diameter, to its base in a lower part where the envelope diameter of said mock arbor is greater than said passage diameter, said mock arbor comprising in the upper part an insertion guide, every section of which, in projection onto a plane perpendicular to said tool axis, is inscribed in an aperture of a collet, and wherein the envelope diameter of said mock arbor is always smaller than said passage diameter, said insertion guide being arranged for a first centring of said collet of said balance spring placed on said upper part and allowed to slide freely under its own weight along said insertion guide, and said insertion guide surmounting at least a lower shank of substantially frustoconical or obelisk shape and which is arranged to complete the self-centring of said collet on said tool axis, and to hold said balance spring without stress on said lower shank, and said lower shank including drive means which are arranged to cooperate with an inner surface of said collet to drive in rotation said mock arbor, without slipping, via said collet or vice versa, said production support tooling further including a holding tool, which is arranged to grip an outer coil of said balance spring, and measuring means arranged to make a measurement of the torque of said balance spring.

22. The production support tooling according to claim 21, wherein said mock arbor is rigid.

23. The production support tooling according to claim 21, wherein said mock arbor includes, at least on said lower shank, lips that are at least radially elastic with respect to said tool axis, and arranged to come into contact with said inner surface of said collet.

24. The production support tooling according to claim 21, wherein said drive means of said lower shank include first flat portions or first recesses, arranged to cooperate in a complementary manner with said inner surface or a polygonal contour of said collet for the relative driving thereof when a torque is applied to said balance spring.

25. The production support tooling according to claim 21, wherein said production support tooling includes means for translation of said holding tool parallel to said tool axis, and/or means for translation of said main tool with respect to said holding tool, and/or means for thrusting said balance spring comprising a flat lower tool movable parallel to said tool axis.

26. The production support tooling according to claim 21, wherein said production support tooling includes a lower flat tool arranged to be movable parallel to said tool axis to position said balance spring in said measuring position.

27. The production support tooling according to claim 21, wherein said production support tooling includes at least one vacuum gripper, for the placing of said balance spring on said mock arbor, and/or for the removal of said balance spring after said measurement.

28. The production support tooling according to claim 27, wherein said production support tooling includes vision means able to control the angular orientation of said gripper to present said balance spring on said main tool in a unique indexed angular position with respect to said holding tool.

29. The production support tooling according to claim 21, wherein a vertical position of said holding tool is adjustable in the field of gravity and/or by twisting.

* * * * *